United States Patent [19]

Holland

[11] 3,997,982

[45] Dec. 21, 1976

[54] TRAINING VEST OR THE LIKE

[76] Inventor: Esther Stebbins Holland, 112 Beacon St., Hartford, Conn. 06105

[22] Filed: Jan. 20, 1976

[21] Appl. No.: 650,869

[52] U.S. Cl. .................................... 35/56; 2/102; 2/119; 35/8 R
[51] Int. Cl.² .......................................... G09B 1/00
[58] Field of Search ......... 2/102, 103, 114, DIG. 7, 2/116, 119; 35/56, 8 R, 49, DIG. 1

[56] References Cited

UNITED STATES PATENTS

| 258,446 | 5/1882 | Link | 2/119 X |
|---|---|---|---|
| 514,720 | 2/1894 | Macgowan | 2/119 X |
| 2,527,242 | 10/1950 | Clark | 35/56 |
| 2,972,820 | 2/1961 | Cano | 35/56 |
| 3,116,491 | 1/1964 | Previdi et al. | 2/102 X |
| 3,638,334 | 1/1972 | Malikowski | 35/56 X |

FOREIGN PATENTS OR APPLICATIONS 909,152  10/1962  United Kingdom ................ 35/8 R Primary Examiner—H. Hampton Hunter
Attorney, Agent, or Firm—McCormick, Paulding & Huber

[57] ABSTRACT

A training vest is provided with a replaceable, practice panel to permit children or handicapped persons to develop manipulative skills in operating various clothing fasteners. The replaceable panel has two separable sections joined together by means of one type of clothing fastener and is releasably attached to the rest of the vest so that each in a series of similar practice panels may be individually substituted in the vest to develop manipulative skills with clothing fasteners of different types and sizes.

10 Claims, 8 Drawing Figures ns of the body. The two panels may be integrally joined at the rear or may be interconnected by a fastening means with which manipulative skills may also be developed.

TRAINING VEST OR THE LIKE

BACKGROUND OF THE INVENTION

The present invention relates to training aids of the type used to develop manipulative skills in young children or handicapped persons. More particularly, the present invention is related to a training aid resembling a garment which is used to develop manipulative skills with various clothing fasteners.

Training aids directed specifically to developing manipulative skills with articles of clothing are highly desirable because of the universal need to teach young children and physically handicapped persons to dress and undress themselves. Some training aids of this type are found in the prior art.

U.S. Pat. No. 2,972,820 discloses a training device comprised of a foldable sheet to which a plurality of clothing fasteners of different types, such as buttons, snaps, laces and buckles are attached. This training device is utilized by spreading the sheet in an unfolded position in front of the person to be trained and allowing him to manipulate the various fasteners either by himself or with the assistance of another person such as a parent or physical therapist. Skills are usually developed first with fasteners such as large buttons or snaps which are relatively easy to manipulate and, as basic skills are developed, more difficult fasteners such as buckles and laces are dealt with. However, particular handicaps may dictate a different approach.

Training aids used to develop skills with clothing fasteners should, however, simulate the actual conditions and circumstances that are encountered when the subject skills are actually needed. In the case of clothing fasteners, the manipulative skills developed from training aids held in front of the person are not directly transferable to actual clothing as it is worn on the body. For example, skills developed in manipulating a button through a buttonhole in a shirt, blouse, or coat are reversed from right to left and top to bottom when the article of clothing is moved from a position in front of a person to a position on the person's body. Quite apart from young children or persons having physical or mental handicaps, individuals having fully developed skills in this area can discern a noticeable difference in the two situations.

A training garment that develops skills which are directly transferable to actual clothing fasteners is disclosed in U.S. Pat. No. 3,638,334. The garment is in effect an abbreviated article of clothing bearing on type of fastener for which the manipulative skills are to be developed. To develop skills with a broad range of clothing fasteners, a series of such abbreviated garments is provided.

It is desirable that manipulative skills be developed for the wide variety of clothing fasteners utilized on todays clothing. It is also desirable that the training aid utilized for this purpose be as compact as possible. Still further, it is desirable that the training device be simple in construction and easy to use while it is worn by the person receiving the desired training. It is, accordingly, a general object of the present invention to provide a training vest or the like which possesses the above qualities without the disadvantages of the prior art devices.

SUMMARY OF THE INVENTION

The present invention relates to a training aid such as a training vest or the like for teaching children and handicapped persons manipulative skills in operating clothing fasteners.

The training aid resembles a vest-like garment and includes a first panel and an associated second panel which are situated respectively over different portions of the body when the training aid is worn as a garment. For example, the first panel may contain an armhole and overlie the right portion of the body while second panel contains an armhole and overlies the left portion of the body. The two panels may be integrally joined at the rear or may be interconnected by a fastening means with which manipulative skills may also be developed.

The training aid also includes a replaceable practice panel which is positioned intermediate the first and second panels during a practice exercise. The practice panel is comprised of separable sections situated in a generally side-by-side relationship between the first and second panels when the training aid is worn on the body, and complementary fastening means for connecting the two sections together.

The replaceable practice panel is one of a series of interchangeable practice panels, each of which has different fastening means and which are individually substituted between the first and second panels. The fastening means are the fasteners for which manual skills are to be developed by the training aid and include various clothing fasteners such as buttons, snaps, zippers, hooks, laces and buckles.

The two sections of the practice panel are joined respectively to the first and second panels of the training aid by means of releasable attaching means for holding the practice panel and the other panels together. The releasable attachment means may take various forms but in one preferred embodiment of the invention, readily releasable adherent strips are attached to the panels and are utilized in multiples to permit adjustment for various body sizes.

Such a training aid is compact since the interchangeable panels represent only a portion of the overall garment which is utilized during a training exercise. Furthermore, the panels can be interchanged without completely removing the garment from the person during a training exercise. By appropriate installation of certain practice panels in the training aid, the characteristics of either male or female garments can be simulated by the same panel. The training aid in vest form can also be made reversible from back to front for developing skills with fasteners at different locations of the body.

DESCRIPTION OF THE PREFERRED EMBODIMENTS

Figure 1:
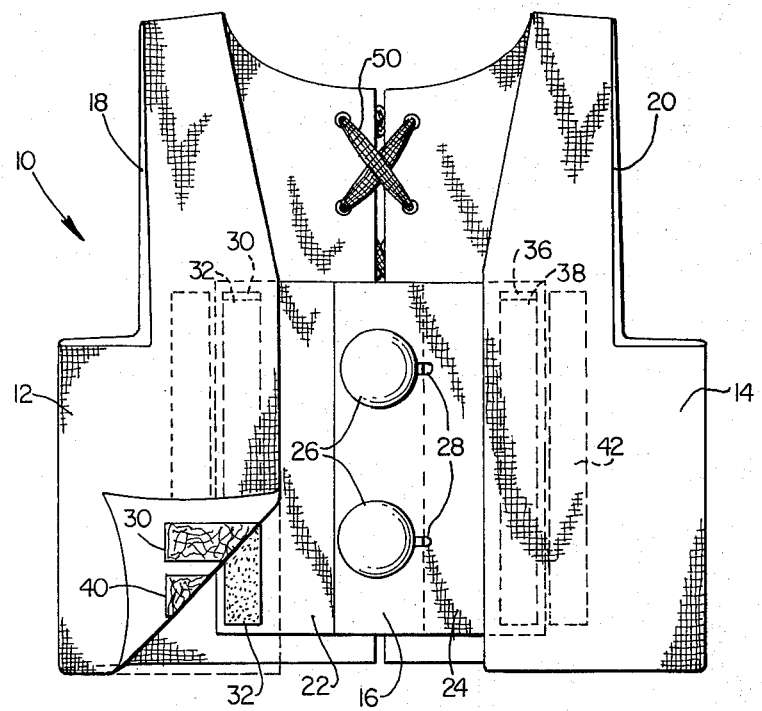
FIG. 1 is a frontal view of the training vest of the present invention in one embodiment.
Figure 2:
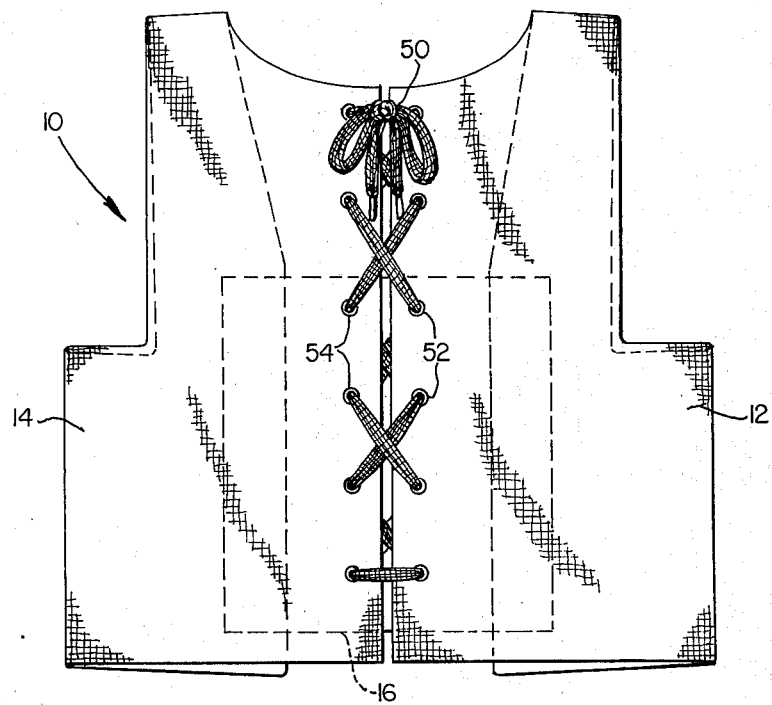
FIG. 2 is a rear view of the training vest in FIG. 1.

FIGS. 1 and 2 illustrate the details of my training aid which enables children or persons having physical or mental handicaps to learn manipulative skills for connecting and disconnecting conventional clothing fasteners. The training aid resembles a garment and in the illustrated embodiment, it is a vest, generally designated 10, which is worn by the person receiving training or therapy during practice exercises.

The vest 10 is comprised of a right panel 12, a left panel 14 and a replaceable practice panel 16. The illustrated panels 12 and 14 form a substantial portion of the vest body since each includes portions which overlie the front, side and rear of the body torso when the vest is worn. However, each of the panels may be comprised of a multitude of fabric pieces or the two panels themselves may be portions of a single or multipiece garment circumscribing the body. Accordingly, the term panel, as used in the present application, refers to a garment portion which may include one or more pieces of material.

The replaceable practice panel 16 is positioned between the panel 12 and 14 at the front of the vest and interconnects the panels so that the vest may be closed around the body. The practice panel 16 is comprised of a right section 22 which is attached to the panel 12 and a left section 24 which is attached to the panel 14. The sections 22, 24 are situated generally in side-by-side relationship; however, they overlap and are held together by means of buttons 26 connected to the section 22 and projecting through buttonholes 28 in the overlapping portion of section 24. The buttons 26 and buttonholes 28 are one type of complementary fastening which is routinely used as a fastener on various types of clothing and which necessitates certain basic manipulative skills for dressing and undressing. Thus, the vest 10 as illustrated in FIG. 1 is set up to enable a child or handicapped person to practice the operations of buttoning and unbuttoning a jacket, blouse or coat.

The practice panel 16 is connected to the panels 12 and 14 at the front of the vest 10 by releasable attachment means so that the panel 16 may be removed and another practice panel having a different type of fastener may be substituted in its place. The attachment means illustrated are comprised of an adherent strip 30 secured to the inside surface of the panel 12 and a cooperative adherent strip 32 attached to the right section 22 of the panel 16. Both adherent strips 30 and 32 are positioned along adjoining edges of the panels 12 and 16 and are pressed together when the panel 16 is installed. In one embodiment of the invention, the strips 30 and 32 are cooperative, adherent strips manufactured from a synthetic fibrous material marketed under the tradename Velcro. Such strips may be pressed together and pulled apart repeatedly and hence, are quite suitable in the training vest utilizing a plurality of replaceable practice panels with distinctively different fasteners.

A similar pair of adherent strips 36 and 38 are attached respectively to the panel 14 and the section 24 of the practice panel 16 to hold the panels in releasable engagement in the same manner as the strips 30 and 32.

If the adherent strips 30 and 32 attached to the panel 12 and the panel 16 respectively do not have the same construction but have cooperative characteristics permitting releasable engagement, then it is desirable that the strips 36 and 38 correspond respectively to the strips 30 and 32 to permit the practice panel 16 to be installed in a reverse position from right to left. Then, by appropriate attachment of the panel 16, the overlap of the sections 22 and 24 may simulate the fly or overlap of either a male or female garment where adjacent edges of the garment are joined together by buttons and buttonholes.

Additional adherent strips 40 and 42 are connected respectively to the panels 12 and 14 in parallel relationship with the strips 30 and 36 respectively to permit adjustment of the vest for different body sizes. The strip 32 on the section 22 may, therefore, attach to either the strip 30 or the strip 40 and similarly the strip 38 on the section 24 may attach to either the strip 36 or the strip 42. The adherent strips thus form adjustable attaching means which give greater versatility to the vest 10.

The panels 12 and 14 are joined together at the rear of the vest 10 by means of a lacing 50. The panel 12 has lace holes 52 extending in a row along its rear edge and the panel 14 has corresponding lace holes 54 extending along its rear edge adjacent the panel 12. The armholes 18 and 20 illustrated in FIG. 1 are cut so that the vest may be worn in a reversed position from back to front and thus the lacing 50 can be situated over the front of the body torso for lacing and tying exercises. The lacing also permits the vest body to be adjusted for various body sizes.

It will also be observed that when the vest is worn in the reversed position, the practice panel 16 is situated over a person's back. Thus, the fastening of buttons, zippers, snaps and other conventional clothing fasteners utilized along the rear openings of blouses and other garments may be simulated with the vest 10 in the reversed position.

FIGS. 3–8 illustrate other replaceable practice panels that may be substituted for the practice panel 16 in FIG. 1. Each of the practice panels of the series is interchangeable with the other and thus may be releasably attached to the right and left panels 12 and 14 of the vest 10. Each of the practice panels has complementary fastening means which are distinctively different from the fastening means on the other panels to permit practice exercises with fasteners of various sizes, shapes or types.

Figure 3:
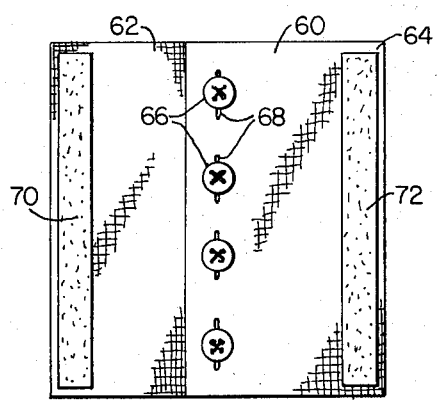
FIGS. 3–8 are frontal views of replaceable practice panels that may be individually substituted for the practice panel illustrated in the training vest of FIG. 1.

In FIG. 3, the practice panel 60 is comprised of sections 62 and 64 having small buttons 66 and buttonholes 68 respectively. An adherent strip 70 is connected to the section 62 along one edge in the same manner as the strip 32 in FIG. 1 and an adherent strip 72 is connected to the other section 64 in the same manner as the strip 38 in FIG. 1. The buttons 66 in the panel 60 are much smaller than the buttons 26 in FIG. 1 and thus require a high level of skill to operate. It should also be noted that the orientation of the buttonholes is varied from that on the panel 16 in FIG. 1 to simulate the standardized orientations found on shirts and similar garments.

Figure 4:
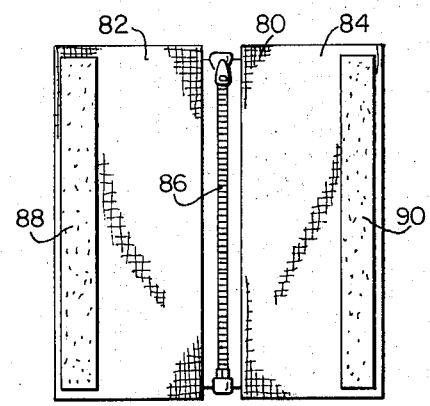

FIG. 4 illustrates a practice panel 80 comprised of sections 82 and 84 which are interconnected along adjacent edges by means of a zipper 86. The sections 82 and 84 bear adherent strips 88 and 90 corresponding respectively to the adherent strips 32 and 38 in FIG. 1. The zipper 86 is a jacket type zipper which allows the sections 82 and 84 to be separated and which requires interengagement of the zipper halves before the slide of the zipper can be pulled closed.

Figure 5:
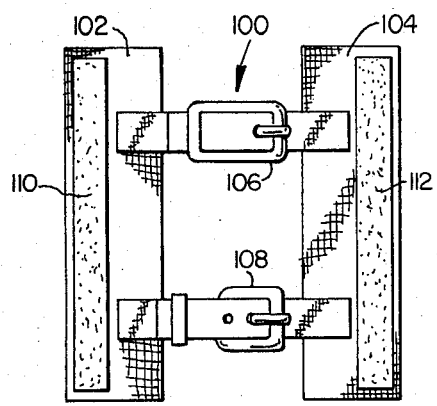

FIG. 5 illustrates a practice panel 100 comprised of sections 102 and 104 interconnected by means of buckles 106 and 108. Adherent 110 and 112 are connected respectively to the sections and correspond to the adherent strips 32 and 38 in FIG. 1. The buckle 106 is a double gated buckle while the buckle 108 is a single gated buckle.

Figure 6:
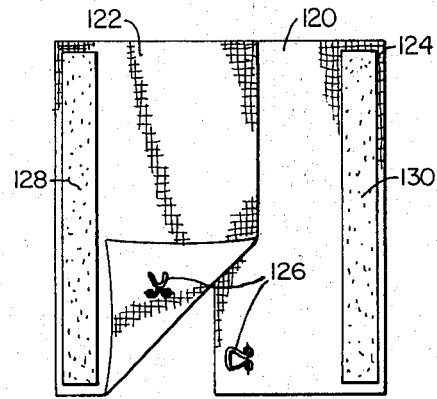

FIG. 6 illustrates a practice panel 120 comprised of sections 122 and 124 which are interconnected by a plurality of hook fasteners 126 (one visible) which form a blind or invisible connection between the panels. Complementary parts of the fastener 126 are attached to the sections 122 and 124 respectively. Adherent strips 128 and 130 connect with the sections 122 and 124 and correspond to the strips 32 and 38 of FIG. 1 respectively.

Figure 7:
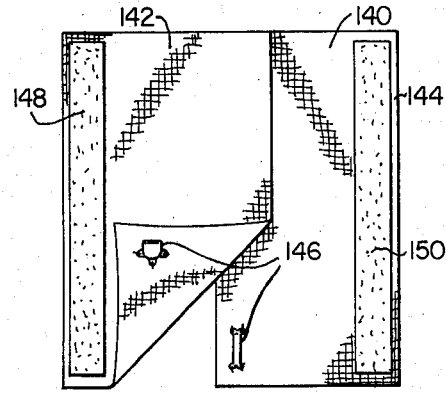

FIG. 7 illustrates another practice panel 140 comprised of sections 142 and 144 which are interconnected by means of hook fasteners 146 (one visible) of a type different from the fastener 126 in FIG. 6. Complementary parts of the fastener 146 are attached to the sections 142 and 144 respectively. Additionally, the sections bear adherent strips 148 and 150 corresponding to the strips 32 and 38 in FIG. 1 respectively.

Figure 8:
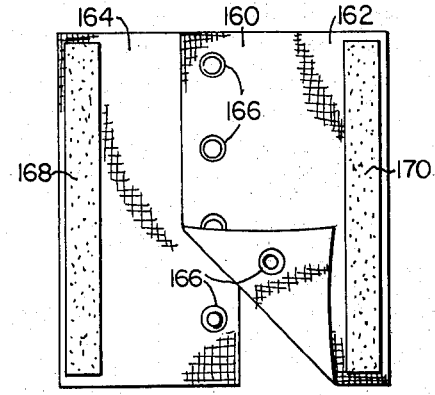

FIG. 8 illustrates a practice panel 160 comprised of sections 162 and 164 that are interconnected by means of a plurality of snaps 166 having complementary male and female portions associated with the sections 162 and 164 respectively. Adherent strips 168 and 170 are located on the sections 162 and 164 in the same manner as in FIG. 1.

In use, the vest 10 is placed on the individual who is to perform the practice exercises with one of the practice panels of the series installed between the panels 12 and 14. A therapist or other instructor may then assist the individual in learning the basic skills of manipulating the fasteners on the practice panel. With persons requiring skills in all types of fasteners, it is contemplated that the exercises would start with panels having more elementary types of fasteners. As experience is gained and skills develop, panels having fasteners which are more difficult to operate would be substituted. For example, it is expected that the panel 16 illustrated in FIG. 1 with large buttons would be utilized with small children before the panel 60 of FIG. 3 having the smaller buttons would be used. It will be noted that the process of changing panels is relatively simple with the releasable adherent strips holding the practice panel in place. It is not necessary to remove the vest 10 from the body when a change in panels is made. With practice panels having fasteners requiring an overlap of the right and left sections, installation is made with the panel orientation providing an overlap corresponding to the sex of the individual being trained. To develop skills for fasteners located at the rear of a dress or blouse, the vest is placed on the person in the reversed position from front to rear. In contrast to dolls or practice boards having various fastening devices, the vest is worn during practice exercises so that the skills and coordination developed is transferable directly to actual garments as they are worn on the body.

Thus, a training vest has been disclosed for teaching children or handicapped persons the skills of manipulating clothing fasteners of various types, sizes and shapes. As a training aid, the vest is compact since it is comprised of a basic jacket body formed by panels 12 and 14 and a series of interchangeable practice panels each bearing distinctively different fasteners. Changing from one panel to another can be accomplished without removing the vest from the body and the overlap of male or female garments may be simulated with the same practice panel. The vest is reversible from back to front so that the different manipulative skills required for the same fastener in front of and behind a person may be developed.

While the present invention has been described in a preferred embodiment, it will be understood that numerous modifications and substitutions can be had without departing from the spirit of the invention. For example, the shape of the panels 12 and 14 may be changed considerably from that illustrated in the drawings. Other types of releasable attachment means may be employed between the panels without destroying the interchangeability of the panels. The various fasteners illustrated in the series of panels are not exhaustive, but merely are exemplary of of the numerous fasteners for which manipulative skills may be developed with the vest 10. It is not essential that the lacing interconnecting the panels at the rear be utilized since a practice panel having sections joined by lacing may also be provided. The materials utilized to form the panels may vary, but preferably they are plainly colored to avoid distraction during a practice exercise. Accordingly, the present invention has been described in a preferred embodiment by way of illustration rather than limitation.

I claim:

1. A training aid resembling a garment for teaching children and handicapped persons manipulative skills in dressing comprising:
   a first panel and an associated second panel which are situated respectively over different body portions when the training aid is worn on the body;
   a replaceable practice panel for positioning intermediate the first and second panels and comprised of two separable sections situated in side-by-side relationship between the first and second panels when the training aid is worn on the body and complementary fastening means on the sections for connecting the two sections together in said side-by-side relationship in a practice exercise;
   first releasable attachment means interposed between the first panel and one of the two sections of the practice panel for holding the first panel and the one section of the practice panel together; and
   second releasable attachment means interposed between the second panel and other of the two sections of the practice panel for holding the second panel and the other section of the practice panel together.

2. A training aid as defined in claim 1 further including in combination a plurality of replaceable practice panels as defined in claim 1, each of said practice panels being interchangeable with the other of said practice panels between the first and second panels and having complementary fastening means distinctively different from the fastening means on the other of said practice panels.

3. A training aid for teaching children and handicapped persons manipulative skills as in claim 1 wherein:
   the first panel and the associated second panel together define a vest-like article covering the right and left sides of the body and the back when worn, the two panels having adjoining edges situated over the back; and
   additional complementary fastening means interconnect the first and second panels at the adjoining edges.

4. A training aid as defined in claim 1 wherein the first and second releasable attachment means are mutually operative attachment means permitting the perspective sections of the practice panel to be attached to either the first or the second panels whereby the practice panel and the complementary fastening means may be reversed from right to left between the first and second panels.

5. A training aid as defined in claim 1 wherein:
the first releasable attachment means comprises two connectible components, one of the components being attached to the first panel and the other of the components being attached to said one section of the practice panel; and
the second releasable attachment means also comprises two connectible components having the same construction respectively as the two components of the first releasable attachment means, one of the components of the second attachment means corresponding to the component connected to the first panel being connected to the second panel and the other of the components of the second attachment means corresponding to said other component of the first attachment means connected to said one section of the practice panel being connected to the other section of the practice panel.

6. A training aid as defined in claim 1 wherein:
the first releasable attachment means comprises an adjustable attachment means for adjusting the size of the aid worn as a garment.

7. A training vest or the like comprising:
a right panel which overlies one portion of the body when the vest is worn;
a left panel which overlies another portion of the body when the vest is worn;
a replaceable intermediate practice panel releasably connected between the right and left panels and having two adjacent and separable sections joined together at adjacent edges of the sections by means of clothing fasteners for which manual skills are to be developed, said practice panel being one of a series of similar practice panels each of which is interchangeable with said practice panel connected between the right and left panels and each including two separable sections joined together by means of clothing fasteners uniquely different from the fasteners on the other practice panels of the series to permit substitution of the practice panels individually between the right and left panels of the vest and development of manual skills with the different clothing fasteners.

8. The training vest of claim 7 wherein first releasable attachment means is interposed between the right panel and one of the two sections of the practice panel for connecting the right and practice panels together and second releasable attachment means is interposed between the left panel and the other of the two sections of the practice panel for connecting the left and practice panels together.

9. The training vest of claim 8 wherein at least one of the releasable fastening means is an adjustable fastening means accommodating different body sizes.

10. The training vest of claim 7 wherein the right and left panels comprise a vest body which is reversible on the body from front to rear whereby the intermediate practice panel may be positioned at either the front or rear of the body.

* * * * *